US012659426B1

(12) United States Patent
Walia et al.

(10) Patent No.: US 12,659,426 B1
(45) Date of Patent: *Jun. 16, 2026

(54) EPHEMERAL CONTENT IN VIDEO CONFERENCES

(71) Applicant: Zoom Video Communications, Inc., San Jose, CA (US)

(72) Inventors: Nitasha Walia, Sunnyvale, CA (US); Zheng Yuan, San Jose, CA (US)

(73) Assignee: Zoom Communications, Inc., San Jose, CA (US)

( * ) Notice: Subject to any disclaimer, the term of this patent is extended or adjusted under 35 U.S.C. 154(b) by 41 days.

This patent is subject to a terminal disclaimer.

(21) Appl. No.: 18/419,208

(22) Filed: Jan. 22, 2024

Related U.S. Application Data

(63) Continuation of application No. 17/514,834, filed on Oct. 29, 2021, now Pat. No. 11,882,382.

(51) Int. Cl.
| | |
|---|---|
| *H04N 7/15* | (2006.01) |
| *H04L 12/18* | (2006.01) |
| *H04N 21/45* | (2011.01) |
| *H04N 21/472* | (2011.01) |
| *H04N 21/4788* | (2011.01) |

(52) U.S. Cl.
CPC ........... *H04N 7/15* (2013.01); *H04L 12/1813* (2013.01); *H04N 21/4532* (2013.01); *H04N 21/47217* (2013.01); *H04N 21/4788* (2013.01)

(58) Field of Classification Search
CPC .. G06F 3/04883; G06Q 10/101; G06Q 50/16; H04L 12/1813; H04L 12/1822; H04L 12/1827; H04L 65/1069; H04M 3/567; H04N 7/141; H04N 7/147; H04N 7/15;

H04N 7/157; H04N 21/4532; H04N 21/47217; H04N 21/4788; H04N 21/6405; H04N 5/2628; H04N 7/142; H04N 7/152; H04N 13/172; G06T 7/251
See application file for complete search history.

(56) References Cited

U.S. PATENT DOCUMENTS

| | | | | |
|---|---|---|---|---|
| 8,208,003 B2 * | 6/2012 | Baird | ....................... | H04N 7/15 |
| | | | | 348/14.09 |
| 8,441,516 B2 * | 5/2013 | Satyanarayanan | ........................... | |
| | | | | H04L 12/1822 |
| | | | | 348/14.09 |

(Continued)

OTHER PUBLICATIONS

"Annotate in Cisco Webex Meetings", Available Online at: https://help.webex.com/en-us/n03wop9/Annotate-in-Cisco-Webex-Meetings, Accessed from Internet on Aug. 24, 2021, 6 pages.

(Continued)

*Primary Examiner* — Gerald Gauthier
(74) *Attorney, Agent, or Firm* — Kilpatrick Townsend & Stockton LLP

(57) ABSTRACT

One example method for displaying ephemeral content in video conferences includes receiving a video conference stream at a client device, displaying the video conference stream on a display in communication with the client device, displaying a content layer over the video conference stream on the display, receiving a content item from a user input device in communication with the client device, displaying the content item in the content layer at a first time, and when a predetermined period of time has elapsed from the first time, automatically removing the content item from the content layer.

20 Claims, 8 Drawing Sheets

700

RECEIVING AND DISPLAYING A VIDEO CONFERENCE STREAM
710

DISPLAYING A CONTENT LAYER OVER THE VIDEO CONFERENCE STREAM
720

RECEIVING A PLURALITY OF INDICATIONS AT DIFFERENT TIMES TO DISPLAY CONTENT ITEMS
730

DISPLAYING EACH OF THE CONTENT ITEMS IN THE CONTENT LAYER WHEN THEY ARE RECEIVED
740

REMOVING EACH OF THE CONTENT ITEMS WHEN A PREDETERMINED AMOUNT OF TIME HAS ELAPSED AFTER DISPLAY OF EACH CONTENT ITEM
750

(56) References Cited

U.S. PATENT DOCUMENTS

| | | | | |
|---|---|---|---|---|
| 8,502,856 | B2 * | 8/2013 | Cranfill | G06F 3/0486 |
| | | | | 348/14.02 |
| 8,665,307 | B2 * | 3/2014 | Setton | H04N 7/157 |
| | | | | 348/14.02 |
| 8,866,877 | B2 * | 10/2014 | Calman | H04N 7/141 |
| | | | | 709/204 |
| 10,664,772 | B1 | 5/2020 | Poel et al. | |
| 11,269,411 | B1 | 3/2022 | Schritter et al. | |
| 11,792,367 | B2 * | 10/2023 | Oz | G06T 7/251 |
| | | | | 348/14.08 |
| 11,882,382 | B2 * | 1/2024 | Walia | H04L 12/1813 |
| 12,400,282 | B1 * | 8/2025 | Atlan | G06Q 50/16 |
| 2011/0043597 | A1 | 2/2011 | Greenwood et al. | |
| 2011/0154382 | A1 * | 6/2011 | Chow | H04N 21/6405 |
| | | | | 725/31 |
| 2011/0205328 | A1 * | 8/2011 | Ozeki | H04N 7/147 |
| | | | | 348/E7.083 |
| 2012/0105573 | A1 * | 5/2012 | Apostolopoulos | H04N 7/142 |
| | | | | 348/E7.083 |
| 2013/0063541 | A1 * | 3/2013 | Kawahata | H04N 7/15 |
| | | | | 348/14.02 |
| 2014/0028785 | A1 * | 1/2014 | Valentine | H04L 12/1822 |
| | | | | 348/E7.083 |
| 2014/0063174 | A1 * | 3/2014 | Junuzovic | G06Q 10/101 |
| | | | | 348/E7.083 |
| 2014/0104369 | A1 * | 4/2014 | Calman | H04M 3/567 |
| | | | | 348/14.08 |
| 2014/0111600 | A1 * | 4/2014 | Schaefer | H04N 7/15 |
| | | | | 348/14.08 |
| 2014/0132701 | A1 * | 5/2014 | Wang | H04L 12/1827 |
| | | | | 348/14.08 |
| 2015/0085065 | A1 * | 3/2015 | Sun | H04N 7/142 |
| | | | | 348/14.08 |
| 2015/0092009 | A1 * | 4/2015 | DeLuca | H04N 7/15 |
| | | | | 348/14.08 |
| 2015/0109401 | A1 * | 4/2015 | Kasatani | H04N 5/2628 |
| | | | | 348/14.07 |
| 2015/0169643 | A1 | 6/2015 | Kogan et al. | |
| 2017/0060405 | A1 * | 3/2017 | Voss | G06F 3/04883 |
| 2021/0124550 | A1 | 4/2021 | Locascio et al. | |
| 2022/0353468 | A1 * | 11/2022 | Walia | H04N 7/147 |
| 2023/0126108 | A1 * | 4/2023 | Roper | H04N 7/147 |
| | | | | 348/14.08 |
| 2023/0135196 | A1 * | 5/2023 | Oh | H04L 65/1069 |
| | | | | 715/756 |
| 2023/0137615 | A1 * | 5/2023 | Walia | H04N 7/15 |
| | | | | 348/14.08 |

OTHER PUBLICATIONS

"How-To: Share and Annotate Content in Zoom Meetings", Available Online at: https://www.miamioh. edu/regionals/eccoe/news/2020/07/share-annotate-content-zoom.html, Accessed from Internet on Aug. 24, 2021, 5 pages.

"Tools for Using Screen Annotation and Handwriting", Available Online at: https://flexteaching.li.duke.edu/files/2020/07/Tools-for-using-screen-annotation-and-handwriting-1.pdf, Accessed from Internet on Aug. 24, 2021, 4 pages.

U.S. Appl. No. 17/514,834, "Final Office Action", Mar. 31, 2023, 12 pages.

U.S. Appl. No. 17/514,834, "Non-Final Office Action", Sep. 2, 2022, 12 pages.

U.S. Appl. No. 17/514,834, "Notice of Allowance", Sep. 14, 2023, 5 pages.

* cited by examiner

600

RECEIVING AND DISPLAYING A
VIDEO CONFERENCE STREAM
610

DISPLAYING A CONTENT LAYER
OVER THE VIDEO CONFERENCE
STREAM
620

RECEIVING A CONTENT ITEM FROM
A USER INPUT DEVICE
630

DISPLAYING THE CONTENT ITEM IN
THE CONTENT LAYER
640

DETERMINING AN AMOUNT OF TIME
TO DISPLAY THE CONTENT ITEM
650

AFTER THE PREDETERMINED TIME
ELAPSES, REMOVING THE
CONTENT ITEM FROM THE
CONTENT LAYER
660

700

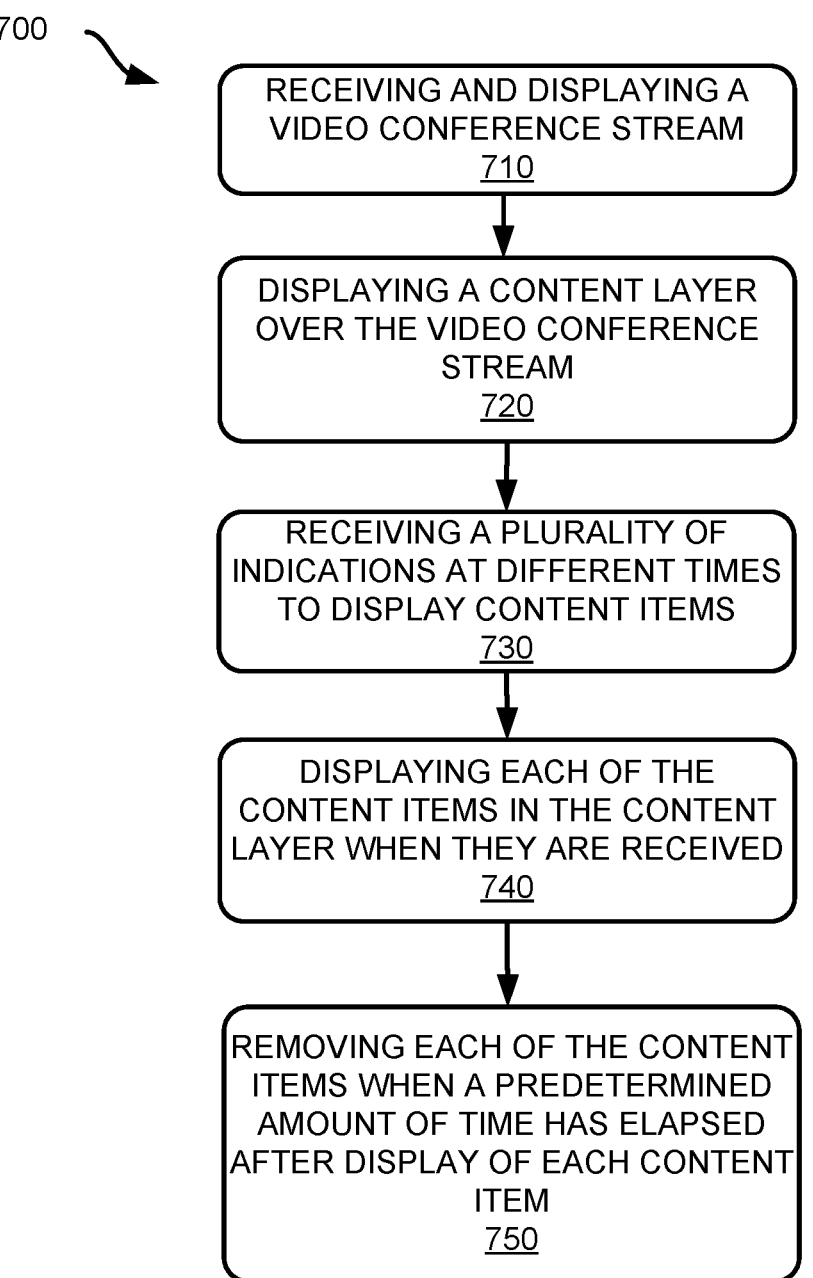

RECEIVING AND DISPLAYING A
VIDEO CONFERENCE STREAM
710

DISPLAYING A CONTENT LAYER
OVER THE VIDEO CONFERENCE
STREAM
720

RECEIVING A PLURALITY OF
INDICATIONS AT DIFFERENT TIMES
TO DISPLAY CONTENT ITEMS
730

DISPLAYING EACH OF THE
CONTENT ITEMS IN THE CONTENT
LAYER WHEN THEY ARE RECEIVED
740

REMOVING EACH OF THE CONTENT
ITEMS WHEN A PREDETERMINED
AMOUNT OF TIME HAS ELAPSED
AFTER DISPLAY OF EACH CONTENT
ITEM
750

*FIG. 7*

EPHEMERAL CONTENT IN VIDEO CONFERENCES

CROSS-REFERENCE TO RELATED APPLICATIONS

The present application is a continuation of allowed U.S. patent application Ser. No. 17/514,834, which issued as U.S. Pat. No. 11,882,382.

FIELD

The present application generally relates to video conferencing and more particularly relates to ephemeral content in video conferences.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

FIGS. 6 and 7 show example methods for displaying ephemeral content in video conferences.

DETAILED DESCRIPTION

Figure 1:
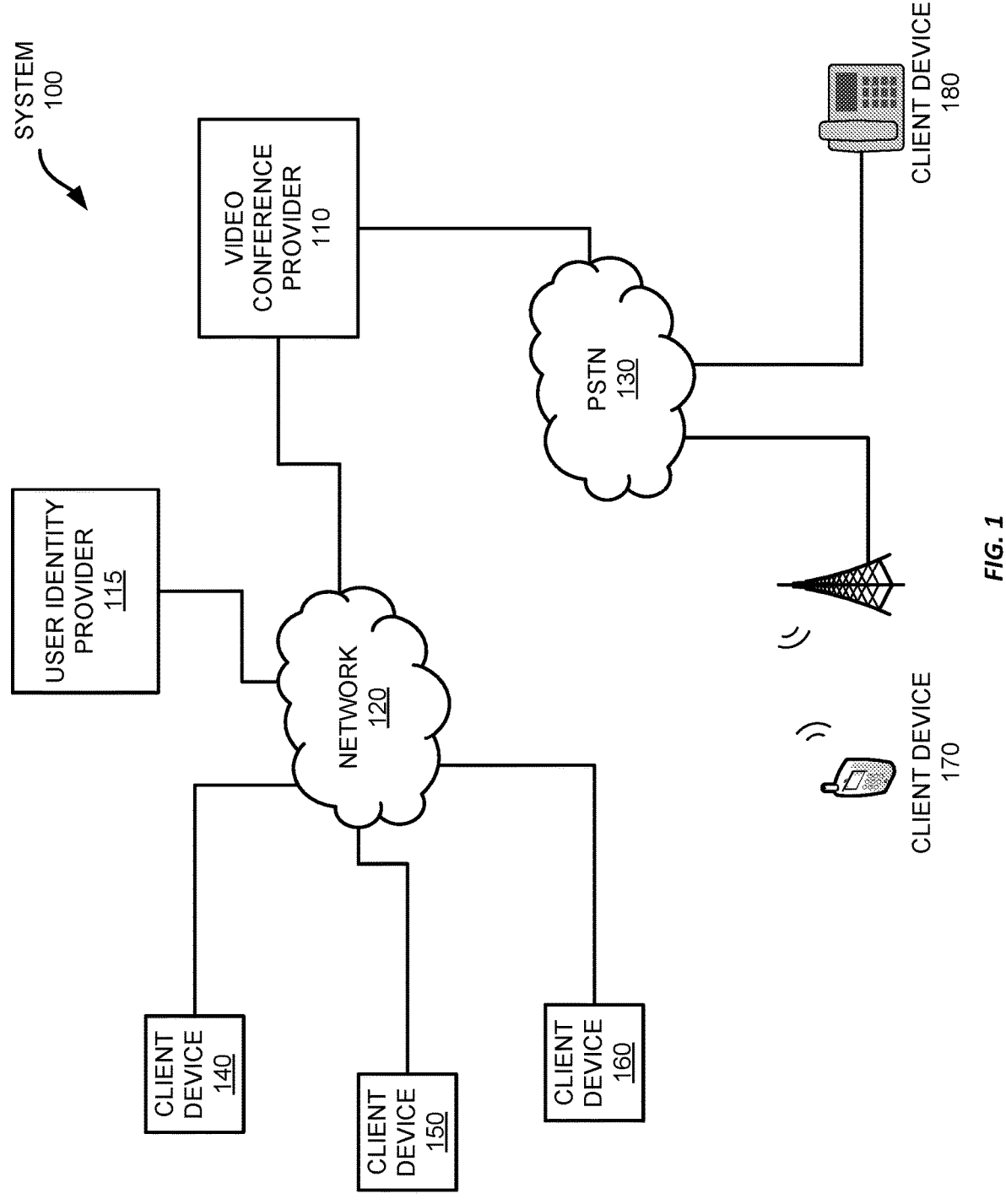
FIGS. 1-2 show example systems for ephemeral content in video conferences.

Examples are described herein in the context of ephemeral content in video conferences. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

During video conferences, such as meetings or webinars, a host often wishes to emphasize or react to various events occurring during the video conference. For example, a host may wish to select a document to share, and then once the document has been shared, highlight a particular portion of the document. The highlight may serve to draw the attention of other video conference participants to that particular portion of the document while the host describes it. As the host continues describing the document, the host may wish to highlight other portions of the document. However, in conventional video conferences, as the host annotates multiple portions of the document, the annotations can become distracting.

Thus examples systems allow the host to create ephemeral annotations and other content items on a client device that are displayed on all the participants' client devices for only a short amount of time and then vanish. Such annotations may be displayed in a visual content layer that is displayed on top of the video conference. When the host creates the annotation, a timer begins to decrement, and when a predetermined period of time elapses, for example three seconds, the content item is removed from the content layer and, from the participants' perspective, vanishes on the client device.

The host may then create a second annotation, which also vanishes after the predetermined period of time. In some examples, the host may create multiple annotations within the predetermined period of time such that more than one annotation is displayed at a time before vanishing. The host may also modify the predetermined period of the time. For example, the host may increase the predetermined period of time so that annotations are displayed in the content layer for a longer period of time.

In other example systems, other participants can create annotations or other content items that are displayed with the video conference. For example, a user may select an emoji to be displayed during the video conference. The emoji is displayed for the predetermined period of time and then is automatically removed from the content layer and thus vanishes.

In some example systems, the annotation may continue to be displayed after the predetermined period expires in response to some action by the host or another participant. For example, the host may click-and-hold on an area including the annotation, causing the annotation to continue to be displayed until the host releases the click.

Video conferences are often recorded. In example systems, the recording may include both the video conference and the annotations. For instance, in one example system, the content layer and video conference are collapsed on one another and recorded as if the annotations are part of the video conference. Later, when the recording is played, the viewers of the recording see the annotations as if they were participating in the original video conference.

This illustrative example is given to introduce the reader to the general subject matter discussed herein and the disclosure is not limited to this example. The following sections describe various additional non-limiting examples and examples of ephemeral content in video conferences.

One example method for displaying ephemeral content in video conferences includes receiving a video conference stream at a client device, displaying the video conference stream on a display in communication with the client device, displaying a content layer over the video conference stream on the display, receiving a content item from a user input device in communication with the client device, displaying the content item in the content layer at a first time, and when a predetermined period of time has elapsed from the first time, automatically removing the content item from the content layer.

One example non-transitory computer-readable medium comprises processor-executable instructions configured to cause one or more processors to receive a video conference stream at a client device, display the video conference stream on a display in communication with the client device, display a content layer over the video conference stream on the display, receive a content item from a user input device in communication with the client device, display the content item in the content layer at a first time, and when a predetermined period of time has elapsed from the first time, automatically remove the content item from the content layer.

One example device comprises a communications interface, a non-transitory computer-readable medium, and one or more processors configured to execute processor-executable instructions stored in the non-transitory computer-readable medium to receive a video conference stream at a client device, display the video conference stream on a display in communication with the client device, display a content layer over the video conference stream on the display, receive a content item from a user input device in communication with the client device, display the content item in the content layer at a first time, and when a predetermined period of time has elapsed from the first time, automatically remove the content item from the content layer.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 120 can be located within a private network to provide video conferencing services to devices within the private network, or it can be connected to a public network, e.g., the internet, so it may be accessed by anyone. Some examples may even provide a hybrid model in which a video conference provider 120 may supply components to enable a private organization to host private internal video conferences or to connect its system to the video conference provider 120 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
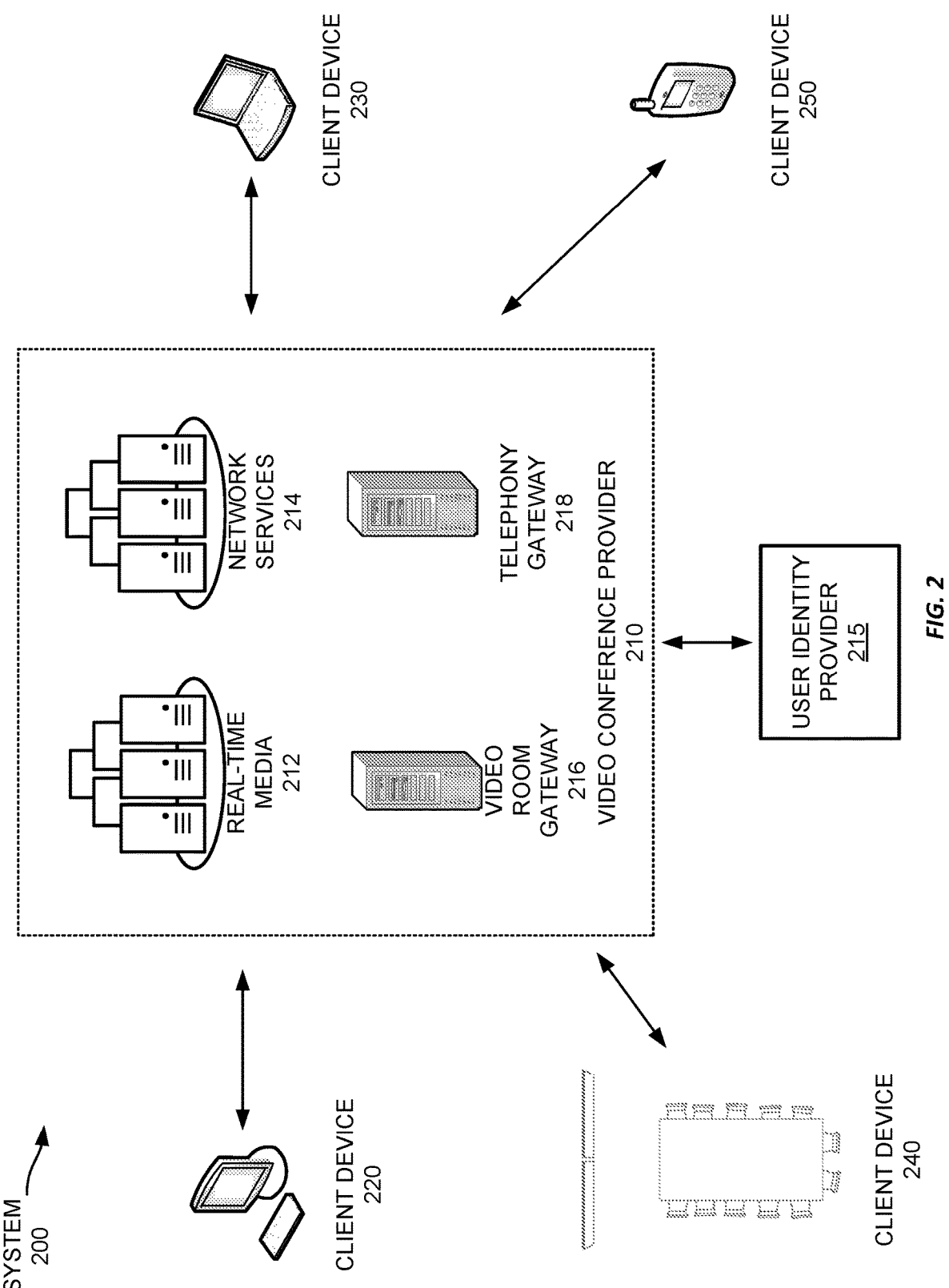

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110.

Meetings in this example video conference provider 110 are provided in virtual "rooms" to which participants are connected. The room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "breakout" rooms. Such breakout rooms may also be rooms that are associated with a "main" videoconference room. Thus, participants in the main videoconference room may exit the room into a breakout room, e.g., to discuss a particular topic, before returning to the main room. The breakout rooms in this example are discrete meetings that are associated with the meeting in the main room. However, to join a breakout room, a participant must first enter the main room. A room may have any number of associated breakout rooms according to various examples.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can make conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110. If such users are able to attend a meeting in which a list of attendees is create, such users may not appear in the list of attendees that are present or have not yet joined or may be represented by some sort of indicator, such as a randomly-generated identifier.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices, etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different aspects of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed streams to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

In some examples, to provide multiplexed streams, the video conference provider 210 may receive multimedia streams from the various participants and publish those streams to the various participants to subscribe to and receive. Thus, the video conference provider 210 notifies a client device, e.g., client device 220, about various multimedia streams available from the other client devices 230-250, and the client device 220 can select which multimedia stream(s) to subscribe to and receive. In some examples, the video conference provider 210 may provide to each client device the available streams from the other client devices, but from the respective client device itself, though in other examples it may provide all available streams to all available client devices. Using such a multiplexing technique, the video conference provider 210 may enable multiple different streams of varying quality, thereby allowing client devices to change streams in real-time as needed, e.g., based on network bandwidth, latency, etc.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the client device 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, creating sub-meetings or "break-out" rooms, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to create a break-out room for one or more meeting participants to join, such a command may also be handled by a network services server 214, which may create a new meeting record corresponding to the break-out room and then connect one or more meeting participants to the break-out room similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider 210 when it is first installed and the video room gateway servers 216 may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
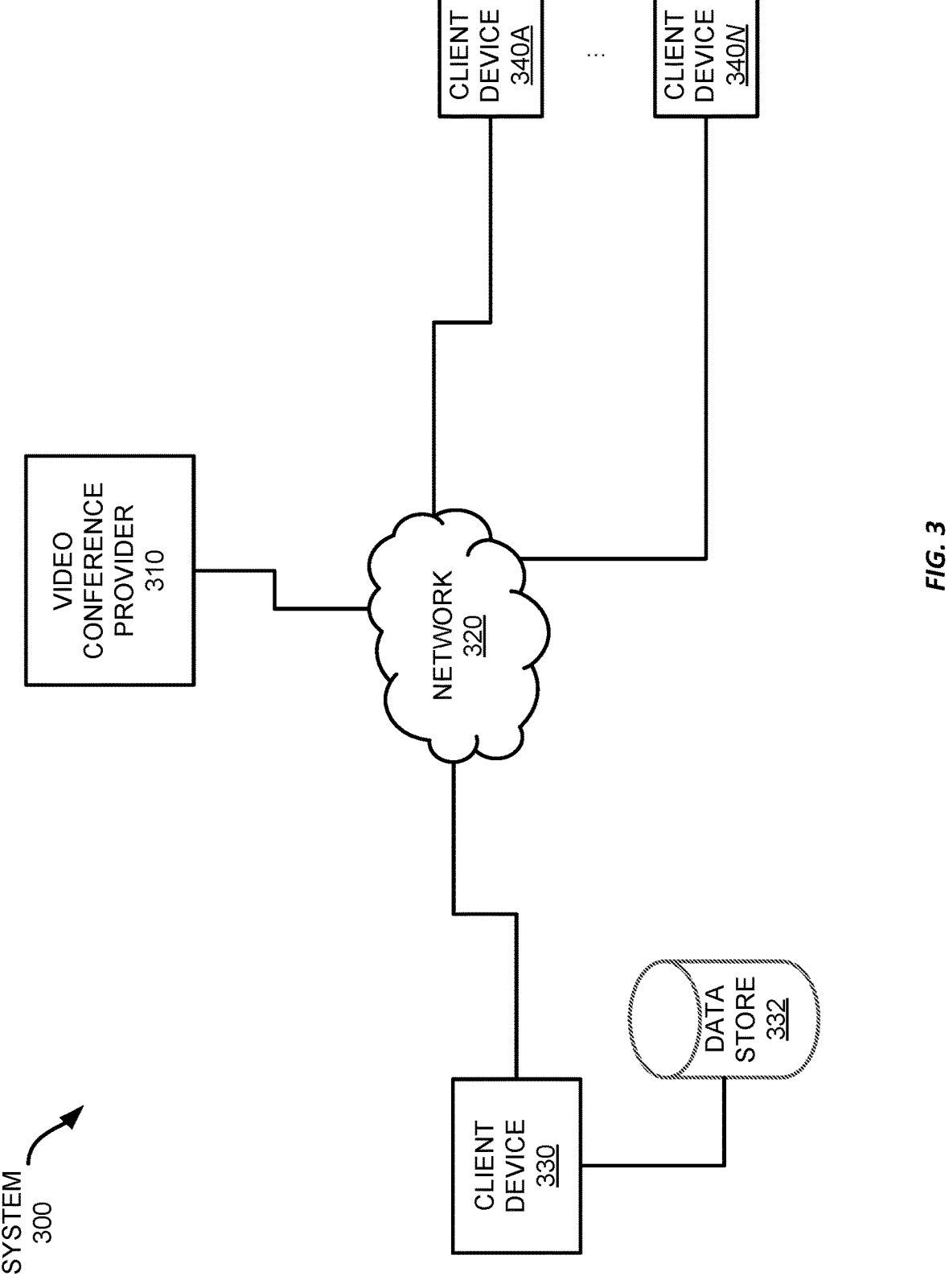
FIG. 3 shows an example system for ephemeral content in video conferences.

Referring now to FIG. 3, FIG. 3 shows an example system 300 for ephemeral content in video conferences. In this example system 300, a number of client device 330, 340a-n are connected to a video conference provider 310 via a communications network 320. In this example, the communications network 320 is the internet, however, any suitable communications network or combination of communications network may be employed, including LANs (e.g., within a corporate private LAN), WANs, etc.

Each client device 330, 340a-n executes video conference software, which connects to the video conference provider 310 and joins a meeting. During the meeting, the various participants (using video conference software at their respective client devices 330, 340a-n) are able to interact with each other to conduct the meeting, such as by viewing video feeds and hearing audio feeds from other participants, and by capturing and transmitting video and audio of themselves.

When scheduling a new meeting, a participant hosting the video conference using client device 330 executes a software application, such as a calendar application, to generate a scheduled event. As part of creating the scheduled event, the host may invite other users to attend the event. The calendar application may then generate invitations, for example email messages, that are sent to other client devices 340*a-n*. The list of attendees are saved in data store 332.

The invited users may then use software applications, such as email applications executing on client devices 340*a-n* to access and accept the invitations. Accepting an invitation generates a message back to the host at client device 330. The response can then be stored in data store 332 so that it is associated with the calendared event. For example, a scheduled event may be associated with an event identifier. The event identifier may also be associated with invitations, attendees, and responses so that the various data can be retrieve in combination with the calendar event to, for example, display a list of invited users.

To help illustrate how a software application, e.g., software application 360, may interact with a video conferencing application, e.g., video conferencing application 350, to create a customized video conference experience, reference will be made to FIGS. 4 through 7, which illustrate different example representations of a video conference.

Figure 4:
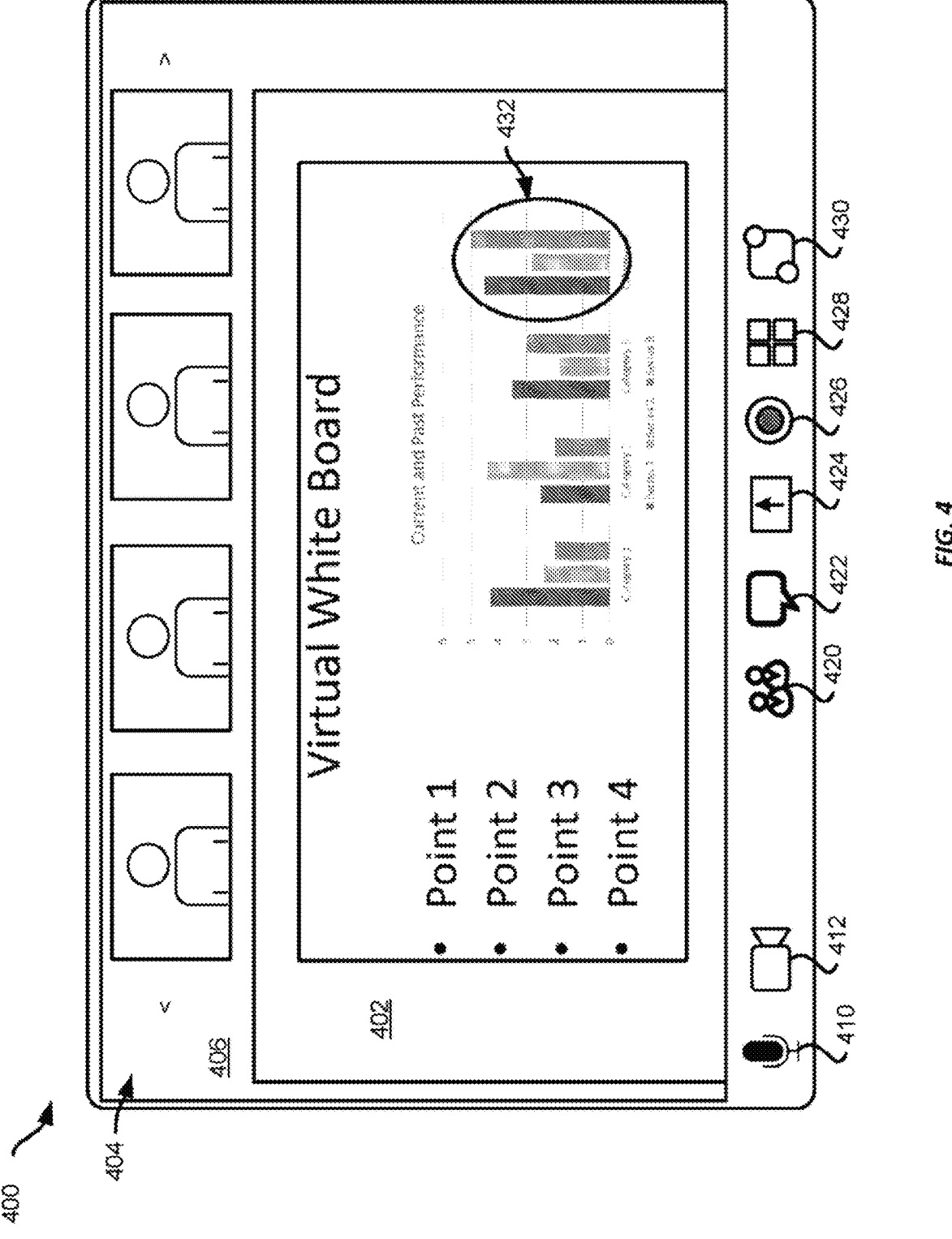
FIG. 4 shows an example graphical user interface for ephemeral content in video conferences.

Referring now to FIG. 4, FIG. 4 shows an example GUI 400 presented to participants in a video conference. A client device, e.g., client device 330 or client devices 340*a-n*, executes video conferencing software, which in turn displays the GUI 400 on the client device's display. In this example, the GUI 400 includes a shared content window 402 that presents the current speaker in the video conference. Above the shared content window 402 are smaller participant windows 404, which allow the participant to view some of the other participants in the video conference, as well as controls ("<" and ">") to let the host scroll to view other participants in the video conference. Both the shared content window 402 and the participant windows are overlaid on a background 406.

Beneath the shared content window 402 are a number of interactive elements 410-428 to allow the participant to interact with the video conference software. Controls 410-412 may allow the participant to toggle on or off audio or video streams captured by a microphone or camera connected to the client device. Control 420 allows the participant to view any other participants in the video conference with the participant, while control 422 allows the participant to send text messages to other participants, whether to specific participants or to the entire meeting. Control 424 allows the participant to share content from their client device and thus display the shared content window 402. Control 426 allows the participant toggle recording of the meeting, and control 428 allows the user to select an option to join a breakout room. Finally, control 430 allows the participant to create an ephemeral content item in the shared content window 402.

When the user shares content by clicking control 424, shared content is displayed in the shared content window 402. In the example shown, a virtual white board is displayed in the shared content window. If the user sharing the content wishes to annotate the shared content, the user can select control 430. The user then can create the annotation 432. In the example shown, the annotation is a circle drawn around a portion of the virtual white board. The annotation may serve to draw the attention of the participants of the video conference. While the annotation 432 is shown as an oval, other types of annotations may be used. For example, the host might use a highlight, a line, an arrow, a shape, such as the oval, or a drawing.

In the example shown, the annotation is created in a layer that is displayed on top of the shared content window 402 as if a piece of transparent film was placed above the virtual white board. For example, the content layer may be created such that its edges are at the same location as the edges of the video conference stream. And the z-order of the content layer is set so that it is displayed on top or in front of the video conference stream. The layer may also include composition attributes that define how the layer is composited with or blended with the video conference stream.

The annotation 432 is ephemeral. It is created at a first time and then after a predetermined period of time passes from the first time, the annotation 432 is automatically removed from the content layer and appears to participants in the video conference to have vanished.

The host may create a first annotation at a first time and a second annotation at a second time. If the second time follows the first time by more than the predetermined period of time, then the first and second annotations are not displayed. For instance, in one example system, the predetermined period of time is three seconds. The host creates a first annotation, and four seconds later creates a second annotation. Because the second annotation is created more than three seconds after the first annotation, the two annotations are not displayed simultaneously. However, if the first annotation is created at a first time, and the second annotation is created only two seconds later, then the two annotations are displayed for one second.

In some example systems, the predetermined period of time may be modified. For example, the host may change a setting such that the predetermined period of time is shorter or longer than the default. In other example systems, certain actions by users—the host or other participants—may cause the predetermined period to change. For instance, in one system, a host can cause the annotation to be displayed longer than the predetermined time by clicking on the annotation. In another embodiment, the system may sense that a participant has not seen the annotation and so delays when the annotation is removed from the content area until the system detects that the participant has viewed the annotation. For instance, the participant might indicate having seen the annotation by pressing a key on a keyboard. Alternatively, the example system may detect that the user has seen the annotation based on monitoring the user's gaze. In yet another example system, content items, such as annotations, may be displayed for different period of time depending on the location of the content item within the display. For instance, if the content item is displayed near the center of the screen, the content item may be displayed for a shorter period of time than a content item displayed near the edge of the screen. Such example systems, may make it more likely that participants in the video conference recognize the content item has been displayed.

If the host selects control 426, the client device will cause the video conference to be recorded. Recording the video conference while the annotation 432 is displayed causes both the video conference and the annotation to be stored. For example, the content layer may be collapsed into the video conference. In other words, the presentation is recorded as if a camera were simply recording the video as it is displayed on the display of the client device. In another example, the video conference is recorded separately from the content layer. But each recording includes time stamps such that they can be played back synchronously. In one such example, the content layer contains metadata defining the annotation. For instance, the metadata may include the type of annotation, the size, and the location of the annotation. In another example, the metadata includes a vector representation of the annotation or annotations displayed during the video conference. Such metadata also includes a beginning time stamp and the period of time during which the annotation is displayed or the end time so that the annotation can be reconstructed and displayed synchronously with the video conference during replay of the video conference recording.

Figure 5:
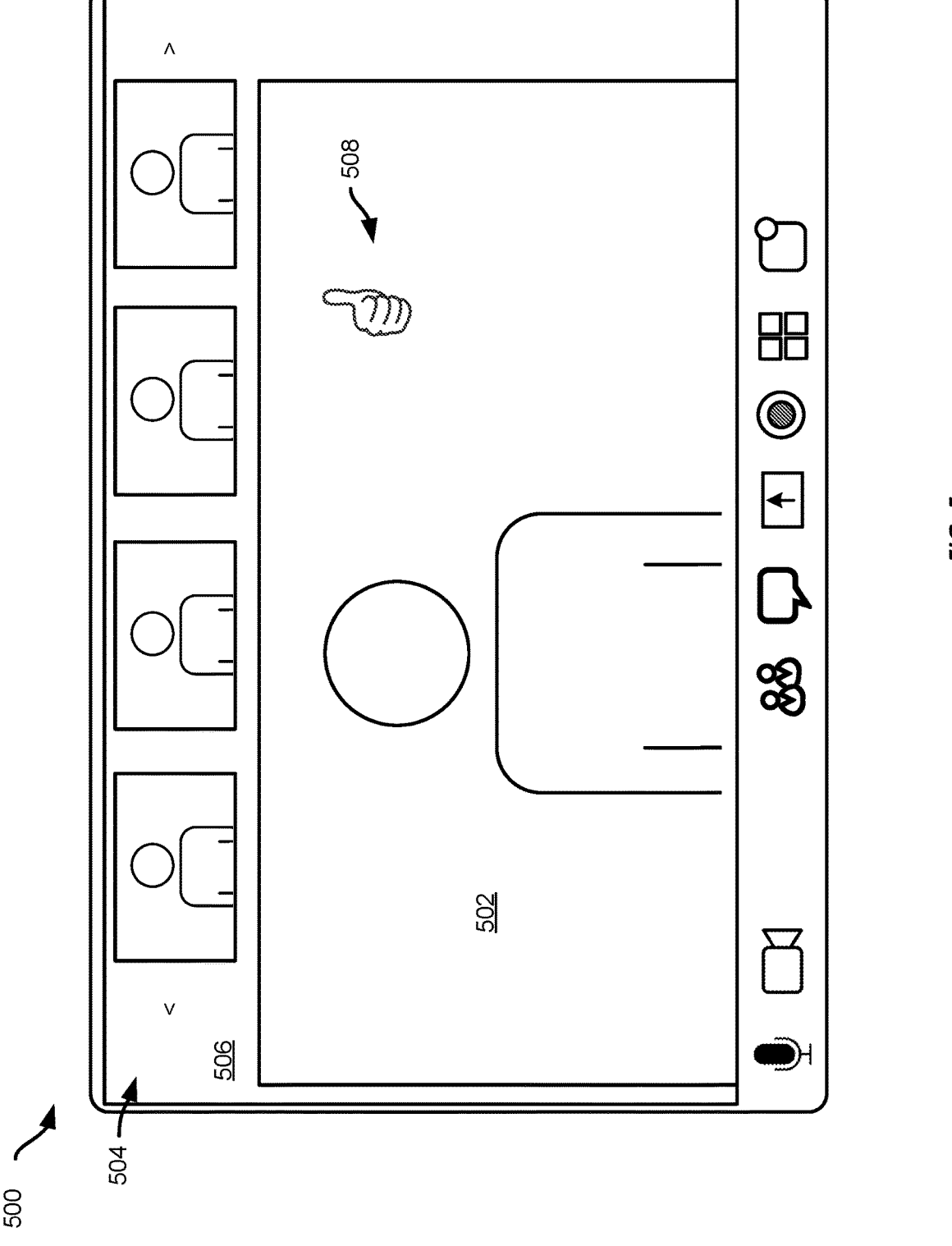
FIG. 5 shows another example graphical user interface for ephemeral content in video conferences.

Referring now to FIG. 5, FIG. 5 shows an example GUI 500 similar to GUI 400, except that the shared content window 402 is replaced by a speaker window 502. In the example shown in FIG. 5, a participant is able to add ephemeral content to the speaker window 502. The example content shown is an emoji, in this case a thumbs up emoji 508. Like the annotation 432 shown in FIG. 4, the thumbs up emoji 508 is displayed at a first time in a content layer in response to a participant's input, and then after a predetermined period of time, the emoji 508 is removed from the content layer.

In such an example system, multiple video conference participants may cause emoji's, such as emoji 508 to be displayed simultaneously. For instance, if a first participant causes a first emoji to appear and a second participant causes a second emoji to appear before the predetermined period of time elapses, then the first and second emoji are displayed simultaneously.

The GUI examples shown in FIGS. 4 and 5 are merely examples. Various other example systems may be created that display ephemeral content—content that appears to vanish after a certain period of time.

Figure 6:
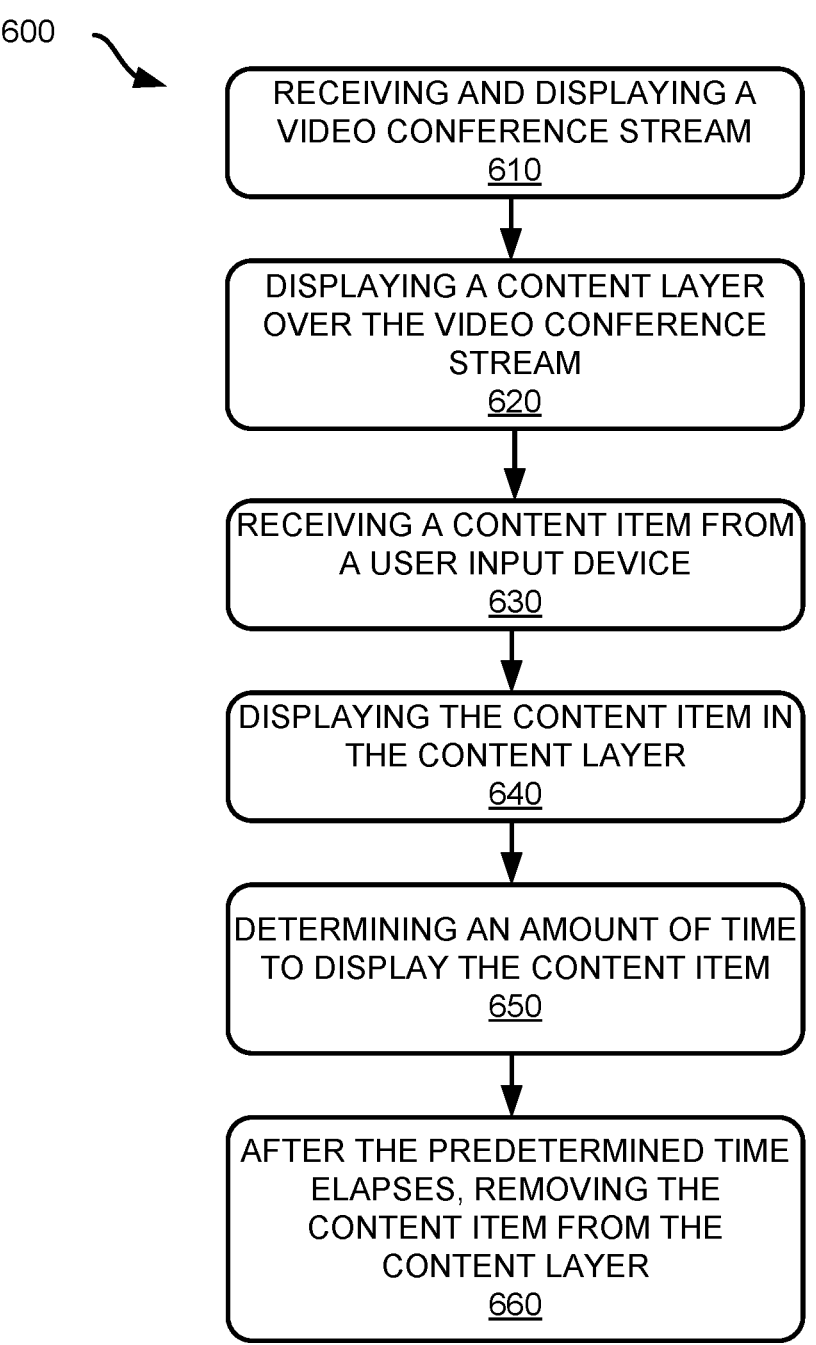

Referring now to FIG. 6, FIG. 6 shows an example method 600 for displaying ephemeral content in video conferences from the perspective of a video conference provider. This example method 600 will be described with respect to the system shown in FIG. 3 and the GUI in FIG. 4; however, any suitable system according to this disclosure may be employed.

At block 610, a client device 330 receives a video conference stream. For example, a host may use a video conferencing application executing on the client device 330 to begin a video conference. In response, the video conference provider 310 begins a video conference and transmits a video conference stream to the client device 330. The client device 330 then displays the video conference stream.

At block 620, the video conferencing application displays a content layer over the video conference stream. The user of the client device cannot see the content layer; the content layer is transparent. In other words, the content layer and the display of the video conference stream appears as a single video on the client device 310.

At block 630, the client device 330 receives a content item from a user input device in communication with the client device 330. For example, the host may use a mouse or a touch-sensitive display to click on a control, such as control 430 in the GUI depicted in FIG. 4. By clicking on the control 430, the host is able to create an ephemeral content item, such as annotation 432. For instance, the user may click on control 430 and then use a finger or a mouse to draw a circle around a portion of virtual white board shown in the shared content control 402.

At block 640, the client device 330 displays the content item in the content layer. When the content item is displayed, it appears with the video conference stream in the location at which the host selects. For example, the annotation 432 shown in FIG. 4. The annotation 432 is displayed at a first time. For instance, the annotation 432 may be displayed when the host releases a button click on a mouse or when the host's finger is removed from a touch screen.

At block 650, the client device 330 determines an amount of time during which to display the ephemeral content item. For example, the period of time may be stored as a default in seconds or milliseconds in the video conference client application. In such a system, the client device 330 requests the time period from the client application. In some such systems, the user of the client video conference application may be able to set or reset the time period during which the ephemeral content is displayed. For instance, if the time period is two seconds, the host may choose to lengthen or shorten the period of time, thereby causing the annotation to be displayed for a longer or shorter period of time, respectively, before vanishing.

At block 660, after the predetermined time period elapses, the client device 330 removes the content item from the content layer. When the content item is removed, it appears to a user of the client video conference application to vanish.

Referring now to FIG. 7, FIG. 7 shows another example method 700 for displaying ephemeral content in video conferences from the perspective of a video conference application executing on a client device. This example method 700 will be described with respect to the system shown in FIG. 3 and the GUI in FIGS. 4 and 5; however, any suitable system according to this disclosure may be employed.

At block 710, a video conference application executing on a client device 330 receives and displays a video conference stream. And at block 720, the client device displays a content layer of the video conference stream. Thus any content displayed in the content layer appears to a user of the video conference application on the client device 330 to be displayed within the video conference stream.

At block 730, the client device 330 receives a plurality of indications to display content items at a plurality of different times. For instance, each of a plurality of users may indicate that an emoji, such as emoji 508, be displayed on a video conference stream. Each user who selects the emoji 508 may select it at different times.

At block 740, in response to each of the inputs from each of the plurality of users, client device 330 displays each emoji indicated by the users' input. For example, a plurality of users may select the thumbs up emoji 508 displayed in the video conference GUI shown in FIG. 5. In response, the emoji 508 is displayed for each of the users at the time the client device 330 receives the indication that the emoji is to be displayed.

At block 750, the client device removes each of the content items after a predetermined period of time has elapsed from when that particular content item is displayed. For example, a first user may select the thumbs up emoji 508 to be displayed. At that point, the client device 330 displays the first thumbs up emoji 508. Subsequently, a second user selects the thumbs up emoji to be displayed, and the client device displays the emoji 508. If the interval of time between when the two users select the content item, then both content items are displayed simultaneously.

While the methods depicted in FIGS. 6 and 7 are depicted as occurring once. However, the depicted methods may be executed repeatedly both in series and in parallel to display ephemeral content in a video conference.

Such systems and methods for displaying ephemeral content in a video conference provide numerous advantages. For instance, such ephemeral content allows a host to capture a video conference participant's attention and focus it on a particular portion of a video conference display. Further, such example systems and methods allow the display of the video conference to remain uncluttered by displaying content items for only a predetermined amount of time. And such systems do not require that the host explicitly delete content to maintain an uncluttered display.

Figure 8:
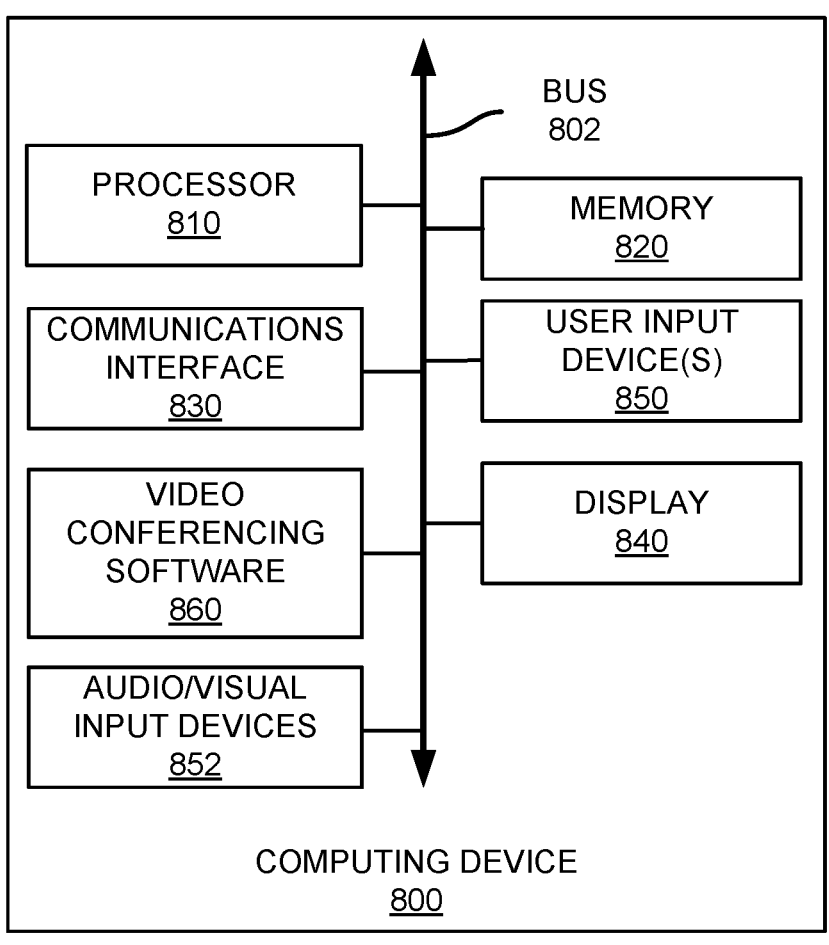
FIG. 8 shows an example computing device suitable for use with example systems and methods for ephemeral content in video conferences.

Referring now to FIG. 8, FIG. 8 shows an example computing device 800 suitable for use in example systems or methods for ephemeral content in video conferences according to this disclosure. The example computing device 800 includes a processor 88 which is in communication with the memory 820 and other components of the computing device 800 using one or more communications buses 802. The processor 88 is configured to execute processor-executable instructions stored in the memory 820 to perform one or more methods for providing dynamic content to video conference waiting rooms according to different examples, such as part or all of the example method described above with respect to FIG. 6. The computing device 800, in this example, also includes one or more user input devices 850, such as a keyboard, mouse, touchscreen, microphone, etc., to accept user input. The computing device 800 also includes a display 840 to provide visual output to a user.

In addition, the computing device 800 includes video conference software 860 to enable a user to join and participate in a video conference, such as a conventional meeting or webinar, by receiving multimedia streams from a video conference provider, sending multimedia streams to the video conference provider, joining and leaving breakout rooms, providing software application content, etc. such as described throughout this disclosure, etc.

The computing device 800 also includes a communications interface 840. In some examples, the communications interface 830 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving a video conference stream at a client device;
displaying the video conference stream on a display in communication with the client device;
displaying a content layer over the video conference stream on the display;
receiving a first content item from a user input device in communication with the client device;
determining a first period of time;
receiving a second content item from the user input device in communication with the client device;
determining a second period of time;
displaying the first content item in the content layer at a first time;

displaying the second content item in the content layer at a second time; and when the first period of time has elapsed from the first time, automatically removing the first content item and the second content item from the content layer.

2. The method of claim 1, wherein the first content item comprises an annotation.

3. The method of claim 2, wherein the annotation comprises at least one of a highlight, a line, or a drawing.

4. The method of claim 1, wherein the first content item comprises an emoji.

5. The method of claim 1, further comprising displaying a white board in place of the video conference stream.

6. The method of claim 1, further comprising creating a first recording of the video conference stream and a second recording of the content layer, the second recording including a plurality of metadata describing the content layer.

7. The method of claim 6, further comprising replaying the first recording of the video conference stream and synchronously displaying the second recording of the content layer, wherein displaying the content layer comprises reconstructing the content layer from the metadata.

8. The method of claim 1, further comprising replaying a recording of the video conference stream and the content layer synchronously.

9. A system comprising:

a non-transitory computer-readable medium; and one or more processor communicatively coupled to the non-transitory computer-readable medium, the one or more processors configured to execute processor-executable instructions stored in the non-transitory computer-readable medium to:

receive a video conference stream at a client device;

display the video conference stream on a display in communication with the client device;

display a content layer over the video conference stream on the display;

receive a first content item from a user input device in communication with the client device;

determine a first period of time;

display the first content item in the content layer at a first time;

determine whether a user interaction with the first content item has occurred; and based on a determination that the user interaction has not occurred, increase the first period of time; and when the first period of time has elapsed from the first time, automatically remove the first content item from the content layer.

10. The system of claim 9, wherein the user interaction comprises a click associated with the first content item.

11. The system of claim 9, wherein the user interaction comprises a user gaze associated with the first content item.

12. The system of claim 9, wherein the one or more processors are configured to execute further processor-executable instructions stored in the non-transitory computer-readable medium to:

receive a second content item from the user input device in communication with the client device;

display the second content item in the content layer at a second time; and when a second period of time has elapsed from the second time, automatically remove the second content item from the content layer.

13. The system of claim 9, wherein the first content item comprises an annotation.

14. The system of claim 13, wherein the annotation comprises at least one of a highlight, a line, or a drawing.

15. A non-transitory computer-readable medium comprising processor-executable instructions configured to cause one or more processors to:

receive a video conference stream at a client device;

display the video conference stream on a display in communication with the client device;

display a content layer over the video conference stream on the display;

receive a first content item from a user input device in communication with the client device;

determine a first period of time;

display the first content item in the content layer at a first time;

determine whether a user interaction the first content item has occurred; and based on a determination that the user interaction has not occurred, increase the first period of time; and when the first period of time has elapsed from the first time, automatically remove the first content item from the content layer.

16. The non-transitory computer readable medium of claim 15, wherein the user interaction comprises a click associated with the first content item.

17. The non-transitory computer readable medium of claim 15, wherein the user interaction comprises a user gaze associated with the first content item.

18. The non-transitory computer readable medium of claim 15, further comprising processor-executable instructions configured to cause one or more processors to receive the first period of time from the user input device.

19. The non-transitory computer readable medium of claim 15, further comprising processor-executable instructions configured to cause one or more processors to, prior to the first period of time elapsing receive an indication from the user input device to cause the content layer to become persistent, and cause the content layer to persist.

20. The non-transitory computer readable medium of claim 15, further comprising processor-executable instructions configured to cause one or more processors to vary the first period of time based at least in part on a location of the first content item on the display.

\* \* \* \* \*